United States Patent [19]

Pillay et al.

[11] Patent Number: 4,852,142
[45] Date of Patent: Jul. 25, 1989

[54] FILTER FOR GAMMA RAY CAMERA

[76] Inventors: Marrimuthoo Pillay, P.O. Box 91114, 3007 MC. Rotterdam, Netherlands; Rajgopal S. Menon, Marshallplein 1, 2286 LG, Rijswijk, Netherlands

[21] Appl. No.: 190,592

[22] Filed: May 5, 1988

[51] Int. Cl.$^4$ ............................................. G21K 3/00
[52] U.S. Cl. .................................. 378/156; 378/145; 250/363.02; 250/363.10; 250/505.1; 420/525
[58] Field of Search ................. 378/19, 145, 147, 149, 378/156–157, 158, 159; 250/363.02, 363.10, 505.1; 420/525

[56] References Cited

U.S. PATENT DOCUMENTS

| | | | |
|---|---|---|---|
| 1,904,175 | 4/1933 | Swartz et al. | 420/525 |
| 2,744,197 | 5/1956 | Gogolick et al. | 420/525 |
| 4,118,632 | 10/1978 | Luig | 378/149 |
| 4,160,165 | 7/1979 | McCombs et al. | 378/19 |
| 4,283,625 | 8/1981 | King | 378/156 |
| 4,618,773 | 10/1986 | Drukier | 378/156 |
| 4,764,946 | 8/1988 | Teleki | 378/145 |

FOREIGN PATENT DOCUMENTS

| | | | |
|---|---|---|---|
| 2377642 | 8/1978 | France | 250/363.02 |
| 0006866 | 5/1963 | Japan | 420/525 |
| 0295991 | 8/1929 | United Kingdom | 420/525 |

OTHER PUBLICATIONS

Pillay, Shapiro, and Cox, European Journal of Nuclear Medicine (1986), vol. 12, pp. 293–295.

Primary Examiner—Craig E. Church
Assistant Examiner—John C. Freeman
Attorney, Agent, or Firm—Killworth, Gottman, Hagan & Schaeff

[57] ABSTRACT

An alloy filter in the form of a plate made from a homogeneous alloy comprising 85–95 wt. % cadmium, 5–15 wt. % copper and up to 3 wt. % of incidental impurities is interposed between a collimator and sodium iodide crystal of a gamma camera. The alloy filter improves image resolution by allowing the passage only of emmissions which impinge substantially perpendicularly on the collimator, while filtering out others which impinge obliquely.

11 Claims, 1 Drawing Sheet

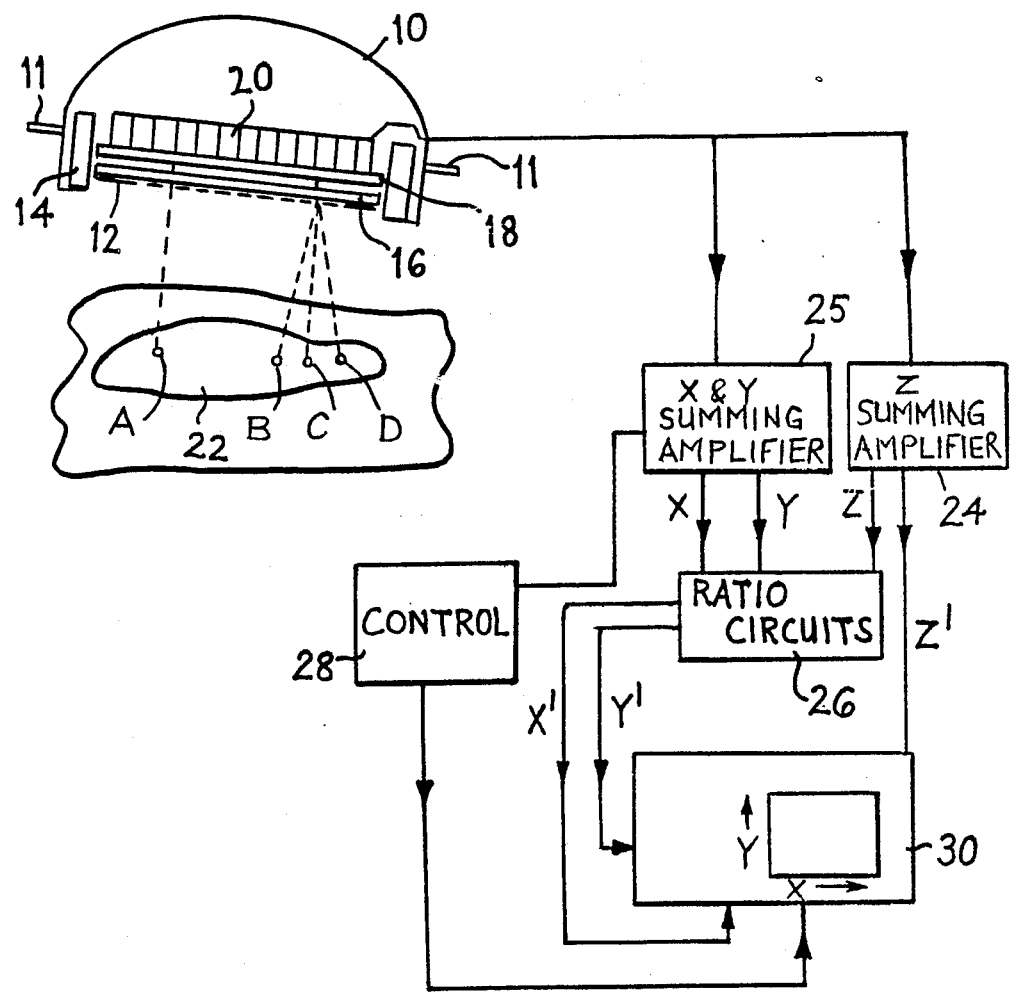

FILTER FOR GAMMA RAY CAMERA

BACKGROUND OF THE INVENTION

This invention relates to an alloy filter for providing improved contrast resolution in a camera for recording gamma rays, e.g. a planar or tomographic camera.

The invention disclosed and claimed herein was first disclosed in Disclosure Document No. 150133 filed at the U.S. Patent and Trade Mark Office on May 9th 1986.

Tomography is an increasingly widely used technique for providing images of internal organs. In this technique, a patient is fed a pharmaceutical substance labelled with a radionuclide, which substance collects preferentially in the organ to be examined, for example the liver or the lung. The radionuclide emits gamma rays from which an image is formed by a gamma-ray camera. This usually comprises a flat scintillating crystal, usually of sodium iodide, behind a collimator in the form of a perforated lead plate or the like. The sodium iodide crystal scintillates whenever it receives a gamma ray having a predetermined minimum energy, and the scintillations are detected by a battery of photomultipliers behind the crystal. Signals from the photomultipliers are then digitised and an image of the organ being examined is constructed from the digitised signals, generally over an exposure time of a few minutes.

DESCRIPTION OF THE PRIOR ART

To prevent lower energy emissions from being falsely registered, for example if two such emissions pass through the collimator together, it has been proposed by Pillay, Shapiro and Cox (Eur J Nucl Med (1986) 12:293–295) to interpose an alloy filter behind the collimator. The above paper describes the improved images obtained using a brass filter with a thickness of 0.7 mm. The purpose of the filter is to attenuate considerably the relatively low energy emissions while allowing the passage of higher energy emissions thereby improving image resolution.

SUMMARY OF THE INVENTION

It is an object of the present invention to provide a filter for a gamma camera which improves image resolution still further.

This object is achieved in accordance with the present invention in that there is provided a filter for a gamma camera comprising a plate made from a homogeneous alloy the essential ingredients of which are 85 to 95 wt. % cadmium and 5 to 15 wt. % copper. The preferred ranges of contents are about 88 to about 92 wt. % cadmium and about 8 to about 12 wt. % copper, more preferably about 90 wt. % cadmium and 10 wt. % copper.

The alloy may also comprise up to about 3 wt. % of incidental impurities, typically iron, antimony and/or nickel.

BRIEF DESCRIPTION OF THE DRAWING

In the accompanying DRAWING shows a typical gamma camera and its associated circuitry.

DETAILED DESCRIPTION OF THE PREFERRED EMBODIMENT

Referring to the DRAWING, a camera head 10 is mounted by means of pivots 11 on a support frame (not shown) to enable it to be moved into the correct position to form an image of an internal organ, shown schematically as 22, in a patient being examined. The organ has been treated with a radionuclide which emits gamma rays to be detected by the camera head 10.

The camera head includes a collimator 12 in the form of a perforated lead plate and a flat sodium iodide crystal 18. An alloy filter plate 16 is provided on the rear surface of the collimator, between the collimator and the crystal. These components are surrounded by a tungsten shield 14 to prevent the entry of stray radiation.

The crystal 18 is optically coupled to a battery of photomultiplier tubes 20. These respond to the scintillations which occur in the crystal when it is struck by gamma rays from the radionuclide to produce voltage pulses which are passed to a processing and recording circuit. This circuit may be of a conventional type which being well known, need not be described in detail here. The circuit shown comprises a Z summing amplifier and energy selector 24, a pair of summing amplifiers 25 generating X and Y pulses, a pair of ratio circuits 26 which compare the X and Y pulses respectively with the Z pulse from the summing amplifier 24 and generates corrected X' and Y' pulses, a storage oscilloscope 30 which constructs an image of the organ from the X' and Y' pulses and from the Z pulses from the summing amplifier 24, and a control unit 28.

The collimator 12 is intended so far as possible to admit to the recording system only those gamma rays which arrive in a direction approximately perpendicular to the plane of the crystal 18. Thus, emissions such as A and C shown in the drawings will pass through the collimator and, provided that they are of sufficient energy, for example 140 keV, will be registered by the photomultiplier tubes as valid emissions. There remains however the possibility in a conventional camera, that two emissions such as B and D, occurring simultaneously and a fraction of a second before the emission C, will be registered since although emissions B and D are at an angle to the perpendicular they may pass through the collimator, albeit partly attenuated, so that if one of them has an energy of say 60 keV and the other an energy of 80 keV the crystal may register these two emissions as a single emission having an energy of 140 keV even though they originate from different positions. At the same time, the X,Y electronics will be prevented from registering the true emission C. If a large number of such events were registered a poor image resolution would be obtained.

To prevent such false emissions from being registered a copper-cadmium alloy filter 16 in accordance with the invention is interposed behind the collimator.

The filter is in the form of an alloy plate. The thickness of the plate is preferably from 0.3 to 0.8 mm, typically 0.5 mm. The plate will usually be substantially circular, its diameter depending on the diameter of the sodium iodide crystal. This diameter will generally be in the range from 200 to 600 mm, typically 400 mm.

It has been found that using a filter of 0.5 mm thickness made from a homogeneous alloy of 90% cadmium and 10% copper, the energy of 80 keV emissions is attenuated by approximately 70% while that of 150 keV emissions is attenuated by only about 14%. Thus, if the photomultiplier tubes are set to a minimum energy of 100 keV they will register essentially all the high energy emissions such as A and B while filtering out most of scattered emissions which would otherwise be detected in the primary energy peak of the radionuclide. This considerably increases the contrast ratio of the images recorded on film, thus improving the confidence in diagnosis with consequent improvements in patient management and treatment.

In addition to the high quality image obtained the filters of the invention have a further advantage in that the alloy plate can be made thinner and lighter than the known brass plates. The plates are also less prone to distortion by bowing. Having fewer components, the alloy also has more consistent properties than brass.

It will be appreciated that when using a camera with a filter such as that described it will be necessary to use a radionuclide having an emission energy of at least 100 keV.

What is claimed is:

1. A filter for a gamma camera comprising a plate made from a homogeneous alloy comprising from about 85 to about 95 wt. % cadmium, from about 5 to about 15 wt. % copper and from 0 to about 3 wt. % of incidental impurities.

2. A filter as claimed in claim 1 which comprises from about 8 to about 12 wt. % copper.

3. A filter as claimed in claim 1 which comprises from about 88 to about 92 wt. % cadmium.

4. A filter as claimed in claim 1 which comprises approximately 90 wt. % cadmium and 10 wt. % copper.

5. A filter as claimed in claim 1 wherein the plate is a substantially circular plate having a diameter of 200 to 600 mm.

6. A filter as claimed in claim 1 wherein the thickness of the plate is from 0.3 to 0.8 mm.

7. A gamma camera comprising an array of photomultipliers a flat scintillating crystal in front of the photomultipliers and optically coupled thereto, a collimator in the form of a perforated metal plate in front of the crystal and spaced therefrom, a filter comprising a plate made from a homogeneous alloy comprising from about 85 to about 95 wt. % cadmium, from about 5 to about 15 wt. % copper and from 0 to about 3 wt. % of incidental impurities, said filter is located between the collimator and the crystal and circuitry associated with the photomultipliers to form an image from scintillations of the crystal caused by gamma emissions passing through the collimator.

8. A gamma camera as claimed in claim 7 wherein the scintillating crystal is a sodium iodide crystal.

9. A gamma camera as claimed in claim 7 wherein the collimator is made of lead.

10. A gamma camera as claimed in claim 7 wherein a shield of a heavy metal, is provided around the collimator, filter, crystal and photomultipliers.

11. A gamma camera as claimed in claim 10, wherein said heavy metal shield is made of tungsten.

* * * * *